July 26, 1960     T. S. MERTES     2,946,777
SEPARATION OF POLYOLEFINS FROM LIQUID MEDIA
Filed June 21, 1957
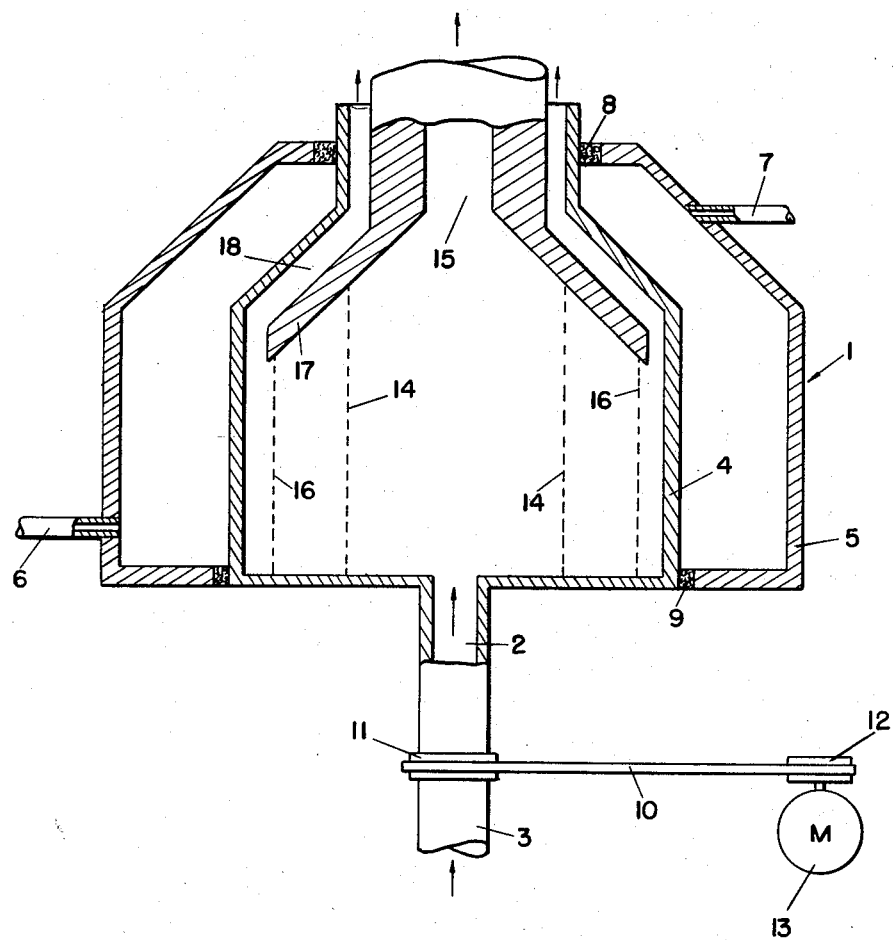
INVENTOR
THOMAS S. MERTES
BY
ATTORNEY

2,946,777
SEPARATION OF POLYOLEFINS FROM LIQUID MEDIA

Thomas S. Mertes, Wilmington, Del., assignor to Sun Oil Company, Philadelphia, Pa., a corporation of New Jersey Filed June 21, 1957, Ser. No. 667,249

3 Claims. (Cl. 260—93.7)

This invention relates to the separation of polyolefins from slurries thereof with liquid media.

In the polymerization of normally gaseous alpha olefins according to the Ziegler technique, the olefin to be polymerized is dissolved in an inert solvent such as n-heptane or isooctane, or lower boiling paraffins, and the solution is contacted with a metal alkyl-metal halide complex catalyst, such as a complex of aluminum triethyl and titanium trichloride. The polymerization reaction may be carried out at temperatures of 150–190° F., in which case the polymer precipitates out of solution as it is formed. After completion of the reaction, the product is ground up to expose catalyst occluded within the polymer, the catalyst is deactivated by treatment with an oxygenated compound such as methanol or isopropanol, and metallic contaminants are removed from the polymer by dissolution in acid. Alternatively, the polymerization reaction may be carried out at temperatures in excess of 270° F., at which temperature the polymer will remain in solution. In this case, the catalyst may be separated by filtration or centrifugation prior to cooling the reaction mixture to precipitate the polymer. In either case, the polymer is recovered as a slurry of porous particles in a liquid medium. This slurry is difficult to filter, and the filter cake produced will contain from 89% to 95% liquid. While some of the liquid may be expressed from the filter cake by mechanical pressure, such pressure will not expel all the liquid, and the balance must be removed to produce a salable dry product. Heretofore this has been accomplished by drying in an oven, which entails very large heat requirements and long residence time.

I have now discovered that polyolefins may be continuously separated from liquid media by processing a slurry of the polyolefin in a liquid which is substantially insoluble in the polyolefin at its melting point, and which has a density less than that of the polyolefin, in a centrifuge the periphery of which is maintained at a temperature higher than the melting point of the polyolefin. The liquid component of the slurry may be the liquid associated with the polymer after removal of catalyst, provide that such liquid meets the above criteria. Such liquids include butane, butylene, isobutane, isobutylene, dimethylamine, methyl amine, ethyl methyl ether, ethylene oxide, propane, propylene, trimethylamine, methanol, ethanol, and acetone. Preferably the liquid component of the slurry has a critical temperature lower than the melting point of the polyolefin, in order to minimize physical carry-over of the liquid in the molten polymer which is a product of my new process. A slurry of polymer in such a liquid may easily be prepared by taking the filter cake from the polymerizer, repulping it with five to ten volumes of the desired liquid, and refiltering to obtain a second filter cake in which most of the original liquid has been replaced by the desired liquid, followed by addition of additional liquid to the filter cake to produce a pumpable slurry. A second repulsing and refiltration may be resorted to in order to reduce the amount of original liquid in the final filter cake to any desired low value.

The slurry of polymer in liquid is then passed to a centrifuge under a pressure sufficient to prevent evaporation of the liquid, and is introduced thereto at a point between the hub and the periphery. The lighter liquid will flow toward the hub and will be withdrawn at a point adjacent thereto, while the heavier polymer will be thrown outwardly towards the periphery of the centrifuge. As the polymer moves outwardly, centrifugal forces acting upon it will gradually increase, so as the cake moves outward it will become more and more compacted, the centrifugal force acting in a manner analogous to mechanical force in a mechanical pressing operation, until when it reaches a point near the periphery, most of the liquid will have been squeezed out of the cake. Prior to its arrival at the periphery of the centrifuge, the cake will meet a layer of molten polymer, which has been melted by contact with the hot walls of the centrifuge. Upon meeting the molten polymer, any liquid still remaining in the cake will boil off and will be forced backward into the interior of the centrifuge, where the vapors will quickly condense, since the unmelted cake just back of the liquid interface is an excellent insulator. Molten polymer, free of liquid contamination, may then be withdrawn from the periphery of the centrifuge at a rate consistent with maintaining a pool of liquid polymer adjacent the periphery.

When the centrifuge is operated at moderate speeds, the liquid component of the slurry may be any liquid which boils sufficiently below the melting point of the polymer to permit substantially complete vaporization thereof upon contact with the pool of liquid polymer. However, at these speeds, the cake at its point of juncture with the molten polymer will still contain a considerable amount of liquid, so that the heat load required to evaporate the liquid content of the cake is high. When operating at high speeds, the cake will be compressed to an extent such that very little liquid is left in the cake, and only a small heat load is required to evaporate the liquid. At high speeds, however, the pressure generated in the centrifuge may be high enough to hold the liquid in liquid phase so that it may disperse in the molten polymer, which is quite viscous, unless the critical temperature of the liquid is below that of the polymer. It is for this reason that I prefer to use liquids having low critical temperatures as the liquid component of the slurry, since if any of the liquid is carried over with the molten polymer, once the pressure is reduced it will vaporize and cause undesirable foaming.

In order that those skilled in the art may more fully appreciate the nature of my invention and the manner of carrying it out, a specific example will be described in connection with the accompanying drawing, which is an elevational view partly in cross-section of a cone-type centrifuge, the cones and feed distributing means having been omitted from the drawing in the interest of clarity, since illustration of these parts would so clutter up the drawing as to make it difficult to point out clearly the exact mode of operation of my invention.

A filter cake from a propylene polymerization in the presence of an aluminum triethyl-titanium trichloride complex catalyst, and which consists of ten parts by volume of solid polypropylene and 90 parts by volume of isooctane, is repulped with ten volumes of butane, under pressure sufficient to maintain the butane in liquid phase, and is refiltered to yield a filter cake consisting of ten parts by volume of polypropylene, 81 parts by volume of butane, and 9 parts by volume of isooctane. This cake is repulped with another 10 volumes of butane, and is refiltered to yield a cake containing less than one percent by volume of isooctane. Sufficient butane is then added to form a pumpable slurry and the slurry is fed to centrifuge 1 through inlet 2 in rotor shaft 3. The centrifuge, as may be observed from the drawing, consists of bowl 4, surrounded by a steam jacket 5, which is provided with a steam inlet line 6 and a steam outlet line 7. Upper and lower seal rings 8 and 9, respectively, provide a seal between bowl 4 and steam jacket 6, so as to prevent the escape of steam. Bowl 4 is rotated by a belt 10 passing over pulleys 11 and 12, the latter being driven by motor 13.

Upon introduction of the slurry into bowl 4 via inlet 2, it is distributed to the interior of bowl 4 at a level indicated by dotted line 14. From this level, the butane will move inwardly and will be withdrawn from the centrifuge through passage 15. The heavier polypropylene will move outwardly toward the periphery of bowl 4 through a compaction zone between dotted line 14 and dotted line 16. Adjacent the dotted line 14, the material in the centrifuge will have approximately the same composition as a filter cake, that is, about 10% solid and 90% liquid. As the cake moves outwardly it is subjected to increasingly greater centrifugal forces, which serve to compact the cake and force butane inwardly, until at the time the cake arrives near the position indicated at dotted line 16, it has a composition of about 90% polypropylene and 10% butane. Dotted line 16 marks the interface between the cake and a pool of liquid polypropylene contained between line 16 and the wall of bowl 4, at a temperature of 375° F. which temperature is maintained by superheated steam in steam jacket 5. This pool was originally built up by allowing polypropylene to remain within bowl 4 until a liquid pool had been built up to a point inward of the outside diameter of conical dam 17, which is preferably formed of an insulating material such as alundum. As the cake nears the position indicated by dotted line 16, the temperature will rise to a degree such that the butane content of the cake will be vaporized and driven back into the interior of the centrifuge, where it will condense and displace backwardly butane in the outwardly flowing cake. Thus the liquid polypropylene will contact only polypropylene particles surrounded by gaseous butane. Under these conditions, the particles will readily melt and be absorbed in the pool of molten polypropylene. Product polypropylene essentially free of normally liquid contaminants is withdrawn as a liquid through passage 18 between conical dam 17 and the wall of bowl 4 at a rate such as to maintain the pool of liquid polypropylene in bowl 4 at the level indicated by dotted line 16.

While the foregoing example described the processing of polypropylene to remove liquid therefrom, essentially the same procedure may be followed in processing isotactic polyethylene and polybutene-1, since these materials have essentially the same physical characteristics, such as melting point and solubility in organic solvents, as has polypropylene. Also, instead of butane, any liquid medium may be used in forming the slurry, so long as it is substantially insoluble in molten polyolefin, and has a density less than the polyolefin.

The invention claimed is:

1. Process for separating solid polyolefins from liquid media which comprises continuously introducing to the interior of a rotating centrifuge bowl a slurry of particulate solid polyolefin in a liquid which is substantially insoluble in melted polyolefin, which has a boiling point lower than the melting point of the polyolefin at the pressures generated within the centrifuge, and which has a density lower than the solid polyolefin, maintaining the wall of the centrifuge bowl at a temperature higher than the melting point of the polyolefin whereby to maintain a layer of melted polyolefin adjacent the wall of the centrifuge bowl, continuously removing liquid from a point adjacent the hub of the centrifuge bowl, and continuously recovering melted polyolefin essentially free from normally liquid contaminants from a point adjacent the wall of the centrifuge bowl.

2. The process according to claim 1 in which the polyolefin is selected from the group consisting of polyethylene, polypropylene, and polybutene-1, which have been formed by the polymerization of the corresponding monomer in the presence of an aluminum alkyl-titanium trichloride catalyst.

3. The process according to claim 2 in which the liquid component of the slurry has a critical temperature lower than the melting point of the polyolefin.

References Cited in the file of this patent

UNITED STATES PATENTS

| 1,782,028 | Burch | Nov. 18, 1930 |
| 2,100,277 | Clayton | Nov. 23, 1937 |
| 2,731,452 | Field et al. | Jan. 17, 1956 |
| 2,815,334 | Killey et al. | Dec. 3, 1957 |